(12) United States Patent
Stehle

(10) Patent No.: US 7,854,242 B2
(45) Date of Patent: Dec. 21, 2010

(54) DEVICE FOR DISCHARGING TIRE SEALANT FROM A CONTAINER

(75) Inventor: Michael Stehle, Überlingen (DE)

(73) Assignee: Doukas AG, Kreuzlingen (CH)

( * ) Notice: Subject to any disclaimer, the term of this patent is extended or adjusted under 35 U.S.C. 154(b) by 929 days.

(21) Appl. No.: 11/654,804

(22) Filed: Jan. 18, 2007

(65) Prior Publication Data

US 2007/0181209 A1  Aug. 9, 2007

(30) Foreign Application Priority Data

Feb. 7, 2006  (DE) ........................ 10 2006 005 787

(51) Int. Cl.
B60C 23/00 (2006.01)
(52) U.S. Cl. ........................ 141/38; 152/415
(58) Field of Classification Search ................ 141/38, 141/41, 98; 152/415
See application file for complete search history.

(56) References Cited

U.S. PATENT DOCUMENTS

| | | | | | |
|---|---|---|---|---|---|
| 4,765,367 | A | * | 8/1988 | Scott | 141/38 |
| 5,070,917 | A | * | 12/1991 | Ferris et al. | 141/38 |
| 5,403,417 | A | * | 4/1995 | Dudley et al. | 141/38 |
| 5,908,145 | A | * | 6/1999 | Jaksa | 141/38 |
| 6,176,285 | B1 | * | 1/2001 | Gerresheim et al. | 152/509 |
| 6,283,172 | B1 | * | 9/2001 | Thurner | 141/38 |
| 6,345,650 | B1 | * | 2/2002 | Paasch et al. | 141/5 |
| 6,412,524 | B1 | * | 7/2002 | Fogal, Sr. | 141/38 |
| 6,736,170 | B2 | * | 5/2004 | Eriksen et al. | 141/38 |
| 6,766,834 | B1 | * | 7/2004 | Eckhardt | 141/38 |
| 6,789,581 | B2 | * | 9/2004 | Cowan et al. | 141/38 |
| 6,889,723 | B2 | * | 5/2005 | Gerresheim et al. | 141/38 |
| 6,964,284 | B2 | * | 11/2005 | Eckhardt | 141/38 |
| 6,968,869 | B2 | * | 11/2005 | Eckhardt | 141/38 |
| 7,021,348 | B2 | * | 4/2006 | Eriksen et al. | 152/415 |
| 7,028,720 | B2 | * | 4/2006 | Eckhardt | 141/38 |
| 7,178,564 | B2 | * | 2/2007 | Kojima et al. | 141/38 |
| 7,389,800 | B2 | * | 6/2008 | Hickman et al. | 141/38 |
| 2003/0056851 | A1 | * | 3/2003 | Eriksen et al. | 141/38 |
| 2004/0173282 | A1 | * | 9/2004 | Laetgaard | 141/38 |
| 2006/0086403 | A1 | * | 4/2006 | Kant et al. | 141/38 |
| 2006/0217662 | A1 | * | 9/2006 | Hickman et al. | 604/153 |

FOREIGN PATENT DOCUMENTS

WO  WO2005/085028  * 9/2005

* cited by examiner

*Primary Examiner*—Gregory L Huson
*Assistant Examiner*—Nicolas A Arnett
(74) *Attorney, Agent, or Firm*—Bachman & LaPointe, P.C.

(57) ABSTRACT

A device for discharging tire sealant (3) from a container (2), the container (2) is connectable to a closure element (1). The pressure source (6) is able to be connected to the closure element (1) and, when a positive pressure is produced in the container (2), a removal opening (12) is able to be released in order to discharge tire sealant (3) from the container (2) into a tire.

25 Claims, 5 Drawing Sheets

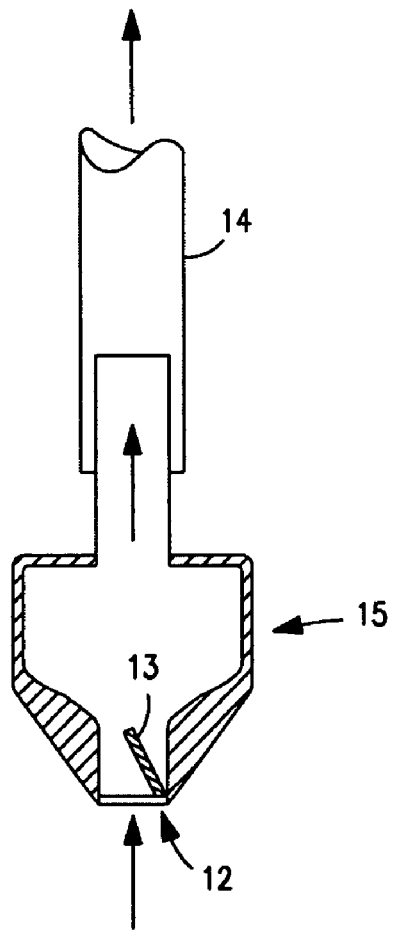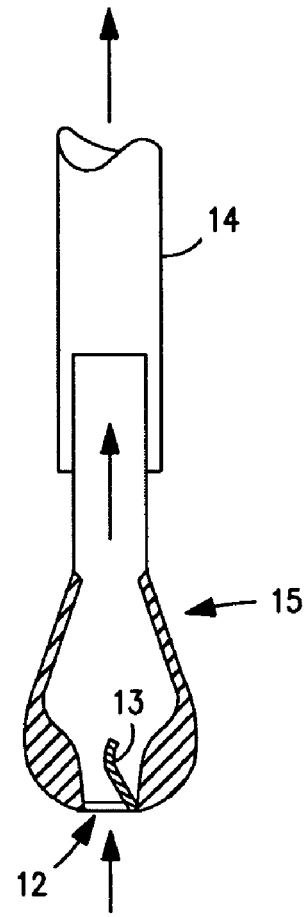
FIG. 3a  FIG. 3b

DEVICE FOR DISCHARGING TIRE SEALANT FROM A CONTAINER

BACKGROUND OF THE INVENTION

The invention relates to a device for discharging tire sealant from a container, the container being connectable to a closure element.

Conventional devices for discharging tire sealant from containers, in particular from pressure-resistant containers, are known and are obtainable commercially in very diverse forms and designs.

They are generally used in vehicles in combination with a compressor as a puncture kit instead of spare wheels.

In this case, the container generally has to be connected to the compressor in a complicated manner and stood upright in order to ensure that tire sealant is discharged from the container. At the same time, containers are known which have to be stood upright or upside down and connected to a pressure source in order to pump tire sealant from the container into a vehicle tire in the event of a puncture.

A disadvantage of conventional devices is that the compressor can only be connected in a highly complex manner using valves, switchover valves, mechanical devices, etc. to a container in order to charge the container with pressure so as to pump tire sealant from the latter into a defective tire. In addition, conventional puncture kits are useable in combination, are complex to install, complicated to operate and much too heavy and too expensive in production.

The present invention is therefore based on the object of providing a device for discharging tire sealant from a container which eliminates the abovementioned disadvantages and with which tire sealant can be inserted directly into a defective vehicle tire in a simple and cost-effective manner without complex connecting operations and complicated handling having to be carried out by the user.

SUMMARY OF THE INVENTION

The object is achieved by a device for discharging tire sealant from a container, the container being connectable to a closure element, characterized in that any desired pressure source can be connected to the closure element and, when a positive pressure is produced in the container, a removal opening can be released in order to discharge tire sealant from the container into a tire.

In the present invention, it has proven particularly advantageous to provide a device for discharging tire sealant from a container, which device has a closure element. The closure element is preferably connectable in a redetachable manner to a container to which any desired pressure source, in particular any desired compressor, can be connected.

In this case, only when a certain positive pressure is reached in an inlet connecting branch is an inlet to a container interior produced, by releasing an inlet closure, in order to charge the container interior with pressure, in particular with atmospheric pressure or positive pressure. A pressure of 3 bar to 5 bar is preferably produced in the container interior via the pressure source.

In this case, the inlet closure itself can be designed as a valve, nonreturn valve, stopper, flap, film, closure stopper or the like in order only to open or release the inlet between pressure source and container interior via the closure element.

If the container interior is charged with positive pressure, then, in order to discharge tire sealant, a closure, directly in the region of the outlet, facing the container interior, or indirectly in the region of a removal device can open, or a removal opening can open by release of a closure, so that tire sealant can be discharged directly via the outlet, if the container should be placed upside down, or indirectly via a removal device, via an ascending pipe inserted in between.

In this case, the closure can be designed as a flap, plug, stopper, valve, film, elastically deformable element or the like in order to open a removal opening when there is a certain selectable positive pressure in the container interior so as to pump the tire sealant via the outlet and via the connecting tube adjoining it into a tire.

The connecting tube here is connected to a valve of a vehicle tire via a correspondingly designed nut.

It has also proven particularly advantageous in the present invention to select a length of the connecting tube which is connected to the closure element to be particularly short, such as of, for example, 2 cm to 8 cm, preferably 3 cm in length, so that via the connecting tube of short design the device or the closure element with the container hangs on the tire or on the valve of the tire and, because of gravity, automatically always hangs downward, thus simplifying and optimizing a position for removing the tire sealant from the container.

This makes it possible to entirely do without standing the container on a base or fixing the container to a compressor. By this means, the user does not have any possibility of inadvertently setting the container into a position in which a discharging of tire sealant is no longer ensured. This is ensured with precision via a connecting tube of particularly short design. This is likewise a significant advantage of the present invention.

In the present invention, it has proven extremely advantageous that the tube can be designed as a flexible tube. By this means, the container for accommodating tire sealant can be attached to a valve of a vehicle tire in order to pump a sealant from the preferably pressure-resistant container into the tire in the event of a puncture.

It is advantageous that no additional standing aid or attachment aid is required.

Furthermore, a rigid connection between the container for accommodating tire sealant and the compressor does not have to be produced in order to stand the tire sealant container vertically in relation to the base so as subsequently to pump the tire sealant into the tire via a very long tube, as is known in the prior art.

It has furthermore proven advantageous in the present invention to design the container for accommodating tire sealant to be oblong and resistant to high pressure. The said container can be directly fitted onto the valve of the tire by the connecting tube, which is preferably selected such that it is short. An ascending pipe can be provided in the container itself, the ascending pipe then pumping the tire sealant completely into the tire when a compressed air source, in particular a compressor, is connected.

In order to save further costs, in particular weight costs, the container can also be designed as a flexible, deformable bag, but which is of pressure-resistant design.

The bag can likewise be attached directly to the valve of the tire via the connecting tube, with an ascending pipe then being provided in the interior of the bag.

A pressure source, in particular a compressor, can be connected to the bag via a common or separate, further connection so as to pump the tire sealant into the tire.

It is advantageous that the bag can be formed in a flexible, very light and weight-saving manner. In the event of a puncture, the said bag can very easily be disposed of after use.

BRIEF DESCRIPTION OF THE DRAWINGS

Further advantages, features and details of the invention emerge from the description below of preferred exemplary embodiments and with reference to the drawing, in which:

FIG. 3a shows a schematically illustrated cross-sectional view of a removal device as a possible component of the closure element;

FIG. 3b shows a schematically illustrated further view of a further exemplary embodiment of the removal device according to FIG. 3a;

DETAILED DESCRIPTION

Figure 1:
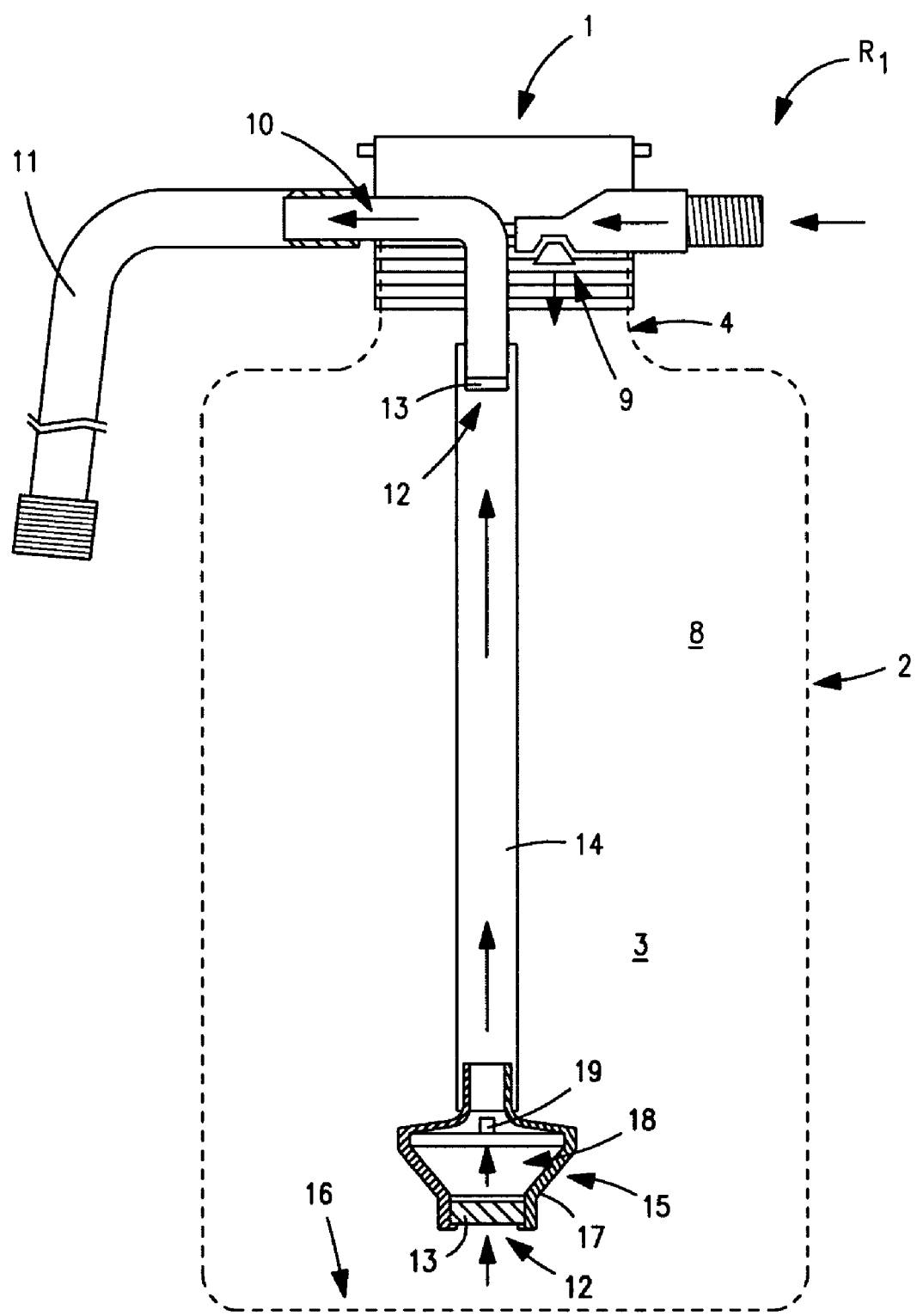
FIG. 1 shows a schematically illustrated, partially cutaway view of a device for discharging tire sealant from a container with a closure element which is connectable to the container.

According to FIG. 1, a device $R_1$ according to the invention has a closure element 1 which can be screwed or can be fastened onto conventional containers 2.

The containers 2 serve to accommodate tire sealant 3 and can be produced from very different materials, preferably from pressure-resistant plastic.

A corresponding external thread onto which the closure element 1 can be screwed is provided in the region of a container neck 4.

The closure element 1 itself is provided with an inlet connecting branch 5 to which any desired pressure source 6, in particular a compressor, pressure container with compressed air or gas, can be connected.

In the region of the inlet connecting branch 5, an inlet 7 is provided in the closure element 1 and produces a connection between inlet connecting branch 5 and a container interior 8 after release of an inlet closure 9. It has proven particularly advantageous in the present invention only to open the inlet 7 when there is a certain and selectable positive pressure of approximately 3 bar to 5 bar in order to charge the container 2, in particular the container interior 8, with positive pressure.

When there is a positive pressure in the inlet 7 or in the inlet connecting branch 5, the inlet closure 9 can automatically open in order to pressurize the container interior 8.

In this case, the inlet closure 9 itself can be designed as a closure stopper, as a valve, as a nonreturn valve, as a flap or as a film in order, when there is a certain and selectable positive pressure, to produce a connection between the pressure source 6 and the container interior 8 so as to charge the pressure-resistant container 2 with positive pressure.

Also provided in the closure element 1 is an outlet 10 to the outside of which a connecting tube 11 of any desired and preferably of short length can be connected in order to produce a connection between a valve (not illustrated specifically here) of a vehicle tire. At the same time, the connecting tube 11 can be connected directly to the valve of a tire with or without the use of a valve.

A connection to the container interior 8 is produced via the outlet 10, with it being possible for tire sealant 3 to be discharged from the container 2 directly via a removal opening 12 or indirectly.

So that, for mounting, for example in a vehicle, the container 2, filled with tire sealant 3, cannot empty, the removal opening 12 is closed by means of at least one closure 13.

Figure 2:
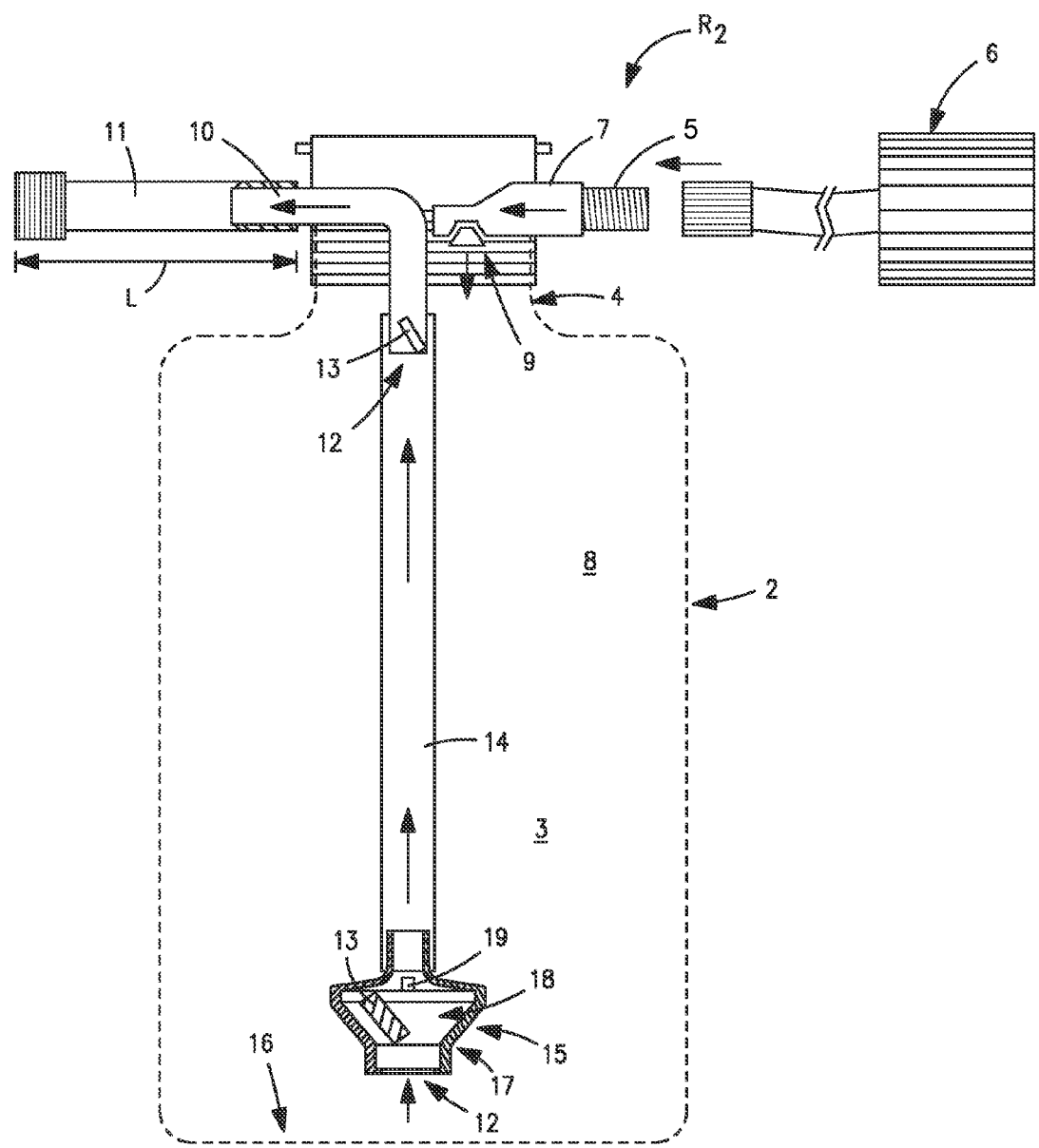
FIG. 2 shows a schematically illustrated view, partially illustrated in longitudinal cross section, of a device for discharging tire sealant from a container with a closure element which is connected or is connectable to the container, as a further exemplary embodiment according to FIG. 1.

As shown in the exemplary embodiment of the present invention according to FIG. 1, any desired closure 13 can be provided directly in the region of the closure element 1 or in the region of the outlet 10 and releases the removal opening 12 only when a positive pressure is correspondingly present, as indicated in FIG. 2.

At the same time, the closure 13 opens and releases the removal opening 12 only when there is a certain and selectable positive pressure in the container interior 8.

In the present exemplary embodiment, a removal device 15 can be arranged at a distance from the actual closure element 1 via an ascending pipe 14 and is situated in the vicinity of a container base 16.

The removal device 15 is preferably heavier than the actual tire sealant or is weighed down by a higher density or, if appropriate, by a weight, so that removal in the vicinity of the container base 16 is ensured continuously when the cylinder is upright or horizontal.

The removal device 15 itself has a basic body 17 which has an interior 18 which is enlarged inward. The closure 13 is preferably inserted in the end region and, when there is a positive pressure in the container 2, is pressed into the interior 18 so as to release the removal opening 12 in order to discharge tire sealant 3 from the container 2.

The closure 13 here can be designed as a closure stopper, as shown in FIGS. 1 and 2, which is then conveyed into the interior 18 of the basic body 17, with continuous opening and releasing of the removal opening 12 and continuous discharging of tire sealant 3 from the container 2 via the outlet 10 and the connecting tube 11 into a vehicle tire remaining ensured via at least one shut-off element 19.

It is also to be considered in the present invention that the corresponding closure 13 may be assigned directly in the vicinity of the outlet 10, preferably facing the container interior 8, or may be provided there. The invention is not restricted to this.

It has furthermore proven particularly advantageous in the present invention to design the connecting tube 11 to be particularly short, in particular in a length L of approximately 2 cm to 8 cm, preferably of 3 cm in length.

This has the advantage that the entire device $R_2$, as indicated in FIG. 2, is attached to the tire valve via a connecting tube 11, which is selected to be short and has a connecting nut (not numbered specifically here) for placing onto and connecting to a valve of a vehicle tire, thus making it possible to automatically dispense with standing the actual container 2 on any desired base. This considerably facilitates the maneuverability and also prevents the device $R_2$ from being connected wrongly to a vehicle tire.

Furthermore, it has proven advantageous in the present invention to connect the container 2 in a hanging manner, in particular a freely hanging manner, via the connecting tube 11 to a valve of a vehicle tire and, as it hangs there, to then operate it in order to discharge tire sealant.

At the same time, it has proven particularly advantageous that the connecting tube can be designed to be very short.

This ensures that the container 2 is oriented such that it always hangs downward in order to be able to fully discharge the tire sealant from the container 2 without orienting or standing it in a precise manner.

The connecting tube 11 here can be designed such that it is freely rotatable in relation to the outlet 10 or via a separate intermediate piece or such that it is rotatable or pivotable about its own axis. This is intended likewise to facilitate a hanging connection of the container 2 to the valve of a vehicle tire.

Furthermore, the scope of the present invention is also intended to cover the fact that the connecting tube 11 can be of angled design, in particular bent design, in order, in particular, to take up the least possible space during storage. If appropriate, a trough 20 may be formed in the container itself on the outside of the outer wall in order to accommodate the bent tube there when not in use.

In the exemplary embodiment of the present invention according to FIGS. 3a and 3b, removal devices 15 are shown in each case, with a removal opening 12 being closable there via a closure 13. In this case, the closure 13 according to FIG. 3a can be designed as a flap and can release the removal opening 12 when there is a determinable positive pressure in the container 2, as indicated by dashed lines.

In FIG. 3b, the closure is designed as an elastic element which releases the removal opening 12 when there is a certain positive pressure in the container 2.

Figure 4:
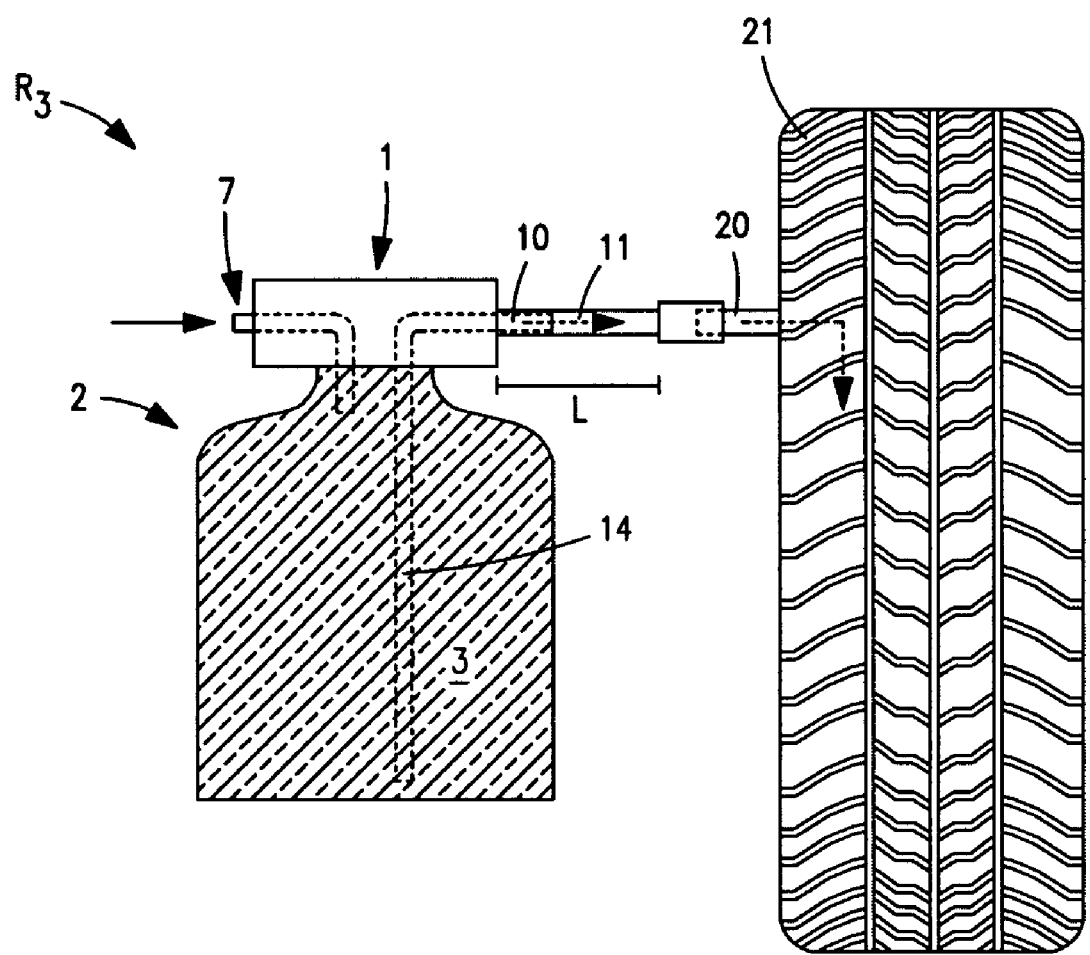
FIG. 4 shows a schematic view of a further device in the use position.
Figure 5:
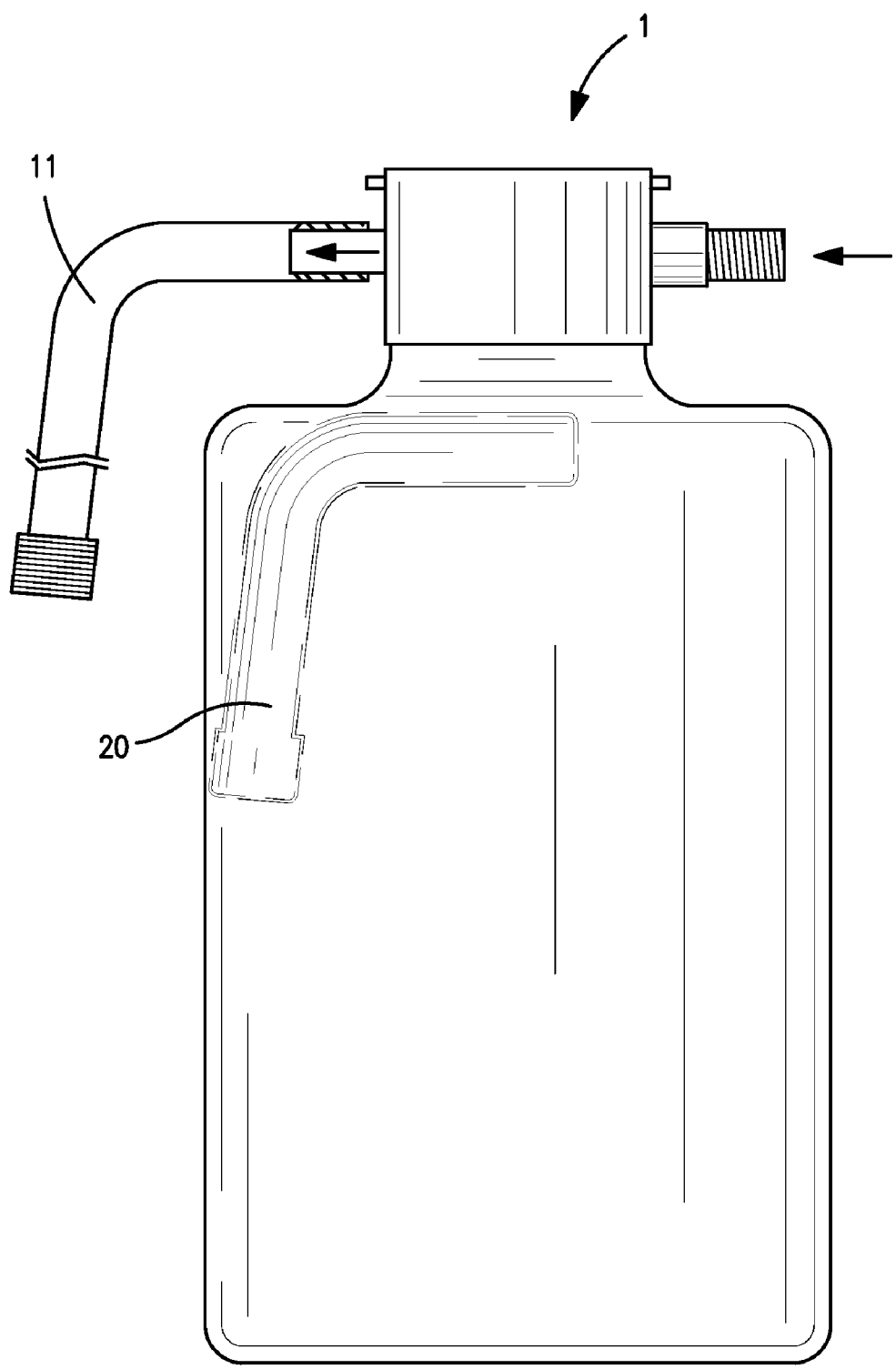
FIG. 5 shows a view of the container of a further embodiment illustrating an angled tube receiving trough.

In the further exemplary embodiment of the present invention according to FIG. 4, a device $R_3$ is shown, in which a container 2 can be attached to a valve 20 of a vehicle tire 21 via the connecting tube 11, which is preferably of short and flexible design.

In this case, the tire sealant 3 can be pumped out of the container 2 via the closure element 1 and the adjoining connecting tube 11 and into the vehicle tire 21 by pressurization via an inlet 7.

For this purpose, an ascending pipe 14 is preferably provided in the container 2 in order to fully discharge the tire sealant from the container 2.

The container 2 is preferably formed from pressure-resistant material.

It has proven advantageous in the present invention also to design the container 2 as a flexible, pressure-resistant bag which can be pressurized by a compressed-air source via the inlet 7 in order to discharge tire sealant.

The flexible bag can be produced from plastic or composite materials, such as aluminum and plastic, etc.

One advantage of the configuration of the container 2 as a bag is that the latter is very light and of little weight and is therefore particularly suitable for the vehicle industry. It can also be produced in a desired shape and correspondingly true to size for certain installation spaces and can easily be disposed of after use in a space-saving manner.

The invention claimed is:

1. A system for discharging tire sealant (3) comprising a container (2), the container (2) is connectable to a closure element (1), a pressure source (6) connected to the closure element (1) via an inlet (7) which has an inlet closure (9) which is released toward an interior (8) of the container (2) when there is positive pressure in the container, and a removal opening (12) which is opened when a positive pressure is produced in the container (2) in order to discharge tire sealant (3) from the container (2) into a tire, a removal device (15) is associated with the closure element (1), wherein the removal device (15) is formed from a basic body (17) in which a closure (13) for releasing the inlet closure (9) is provided.

2. A system according to claim 1, wherein a closure (13) releases the removal opening (12) in the region of the closure element (1) when there is a positive pressure in the container (2).

3. A system according to claim 2, wherein the removal opening (12) is closed by the closure (13) when there is no positive pressure in the container (2).

4. A system according to claim 1, wherein the closure element (1) is connected via a connecting tube (11) directly to a valve of a vehicle tire with or without an inserted valve being used in order to insert tire sealant (3) into the tire.

5. A system for discharging tire sealant (3) comprising a container (2), the container (2) is connectable to a closure element (1), a pressure source (6) connected to the closure element (1) and an inlet closure (9) is released toward an interior (8) of the container (2) when there is a positive pressure in the container, a removal device (15) is associated with the closure element (1) via an ascending pipe (14), wherein the removal device (15) is formed from a basic body (17) in which a closure (13) for releasing the inlet closure (9) is provided.

6. A system according to claim 1 or 5, wherein the inlet closure (9), comprises one of an inlet valve, nonreturn valve, stopper, closure stopper and flap.

7. A system according to claim 1 or 5, wherein, when a positive pressure is reached, the inlet closure (9) opens and charges the container (2) containing tire sealant (3) with pressure.

8. A system according to claim 7, wherein the inlet closure (9) comprises a nonreturn valve which releases at a positive pressure of between 2 bar to 5 bar.

9. A system according to claim 5, wherein, when there is positive pressure in the container (2), the closure (13) releases an inlet opening (12) of the basic body (17) in order to discharge tire sealant (3) directly via an outlet (10) or indirectly via an ascending pipe (14) to a connecting tube (11) for connection to a valve of a tire.

10. A system according to claim 9, wherein the closure (13) is inserted as a stopper in the removal opening (12) of the basic body (17) and, when there is a certain or determinable positive pressure, releases the removal opening (12) in order to remove tire sealant (3) via the outlet (10) and the connecting tube (11) into a tire.

11. A system according to claim 1 or 5, wherein the closure (13) is provided for closing the removal opening (12) in the outlet (10), with the container (2) being able to be placed upside down in order to discharge the tire sealant (3).

12. A system according to claim 5, wherein the removal device (15) is connected to the closure element (1) at a distance therefrom via the ascending pipe (14) with the integrated closure (13) and is arranged in the vicinity of a container base (16) of the container (2).

13. A system according to claim 1 or 5, wherein a specific weight of the removal device (15) is higher than a specific weight of the tire sealant (3).

14. A system according to claim 13, wherein a specific weight of the closure (13) is lighter than a specific weight of the tire sealant (3).

15. A system according to claim 5, wherein the basic body (17) has an enlarged interior (18) for receiving the closure (13) after it has been pressed in and has at least one shut-off element (19) in order to ensure that the tire sealant (3) flows out through the ascending pipe (14).

16. A system according to claim 1 or 5, wherein the closure (13) is designed as a flap or as an elastically deformable element which, when there is positive pressure in the container (2), releases the removal opening (12) in order to discharge tire sealant (3) from the closure element (1) via the outlet (10).

17. A system for discharging tire sealant (3) comprising a container (2), the container (2) is connectable to a closure element (1), a pressure source connected to the container via an inlet (7) which has an inlet closure (9) which is released toward an interior (8) of the container (2) when there is positive pressure in the container, a connecting tube (11) of length (L) is connected to the closure element (1), wherein the container (2) is attached to a valve of a vehicle tire via the connecting tube (11), a removal device (15) is associated with the closure element (1), wherein the removal device (15) is formed from a basic body (17) in which a closure (13) for releasing the inlet closure (9) is provided.

18. A system according to claim 17, wherein the connecting tube (11) has a length (L) of approximately 2 cm to 8 cm.

19. A system according to claim 17, wherein the container (2) is fixed redetachably in a hanging manner to a valve of a vehicle tire by means of the connecting tube (11).

20. A system according to claim 17, wherein the connecting tube (11) is mounted such that it can be freely rotated in the region of an outlet (10) and pivoted about its center axis.

21. A system according to claim 17, wherein the connecting tube (11) is formed in an angled manner.

22. A system according to claim 21, wherein the angled connecting tube (11) is accommodated laterally against the container (2) in a receiving trough.

23. A system according to claim 17, wherein the container (2) is a pressure-resistant container to which an outlet (10) with the adjoining connecting tube (11) and an inlet (7) for the connection of the pressure source (6) are connected.

24. A system according to claim 17, wherein the container (2) is a flexible bag which is formed in a pressure-resistant manner up to approximately 10 bar.

25. A system according to claim 24, wherein the flexible bag is formed from pressure-resistant materials of plastic and metal.

\* \* \* \* \*